United States Patent
Ababneh et al.

(10) Patent No.: US 7,790,295 B2
(45) Date of Patent: Sep. 7, 2010

(54) COMPOSITE MATERIAL IN STRIP FORM AND ITS USE, COMPOSITE SLIDING ELEMENT

(75) Inventors: Maher Ababneh, Ulm (DE); Hans-Achim Kuhn, Illertissen (DE); Volker Voggeser, Voehringen (DE)

(73) Assignee: Wieland-Werke AG, Ulm (DE)

( * ) Notice: Subject to any disclaimer, the term of this patent is extended or adjusted under 35 U.S.C. 154(b) by 82 days.

(21) Appl. No.: 11/724,380

(22) Filed: Mar. 15, 2007

(65) Prior Publication Data

US 2007/0254180 A1 Nov. 1, 2007

(30) Foreign Application Priority Data

Apr. 28, 2006 (DE) .................. 10 2006 019 826

(51) Int. Cl.
*B32B 15/20* (2006.01)
*B32B 15/01* (2006.01)
*B32B 15/18* (2006.01)

(52) U.S. Cl. .................. 428/677; 428/674; 428/684

(58) Field of Classification Search .................. None
See application file for complete search history.

(56) References Cited

U.S. PATENT DOCUMENTS

| | | | |
|---|---|---|---|
| 4,562,122 A | | 12/1985 | Hodes et al. |
| 5,124,124 A | * | 6/1992 | Ohashi et al. ............ 420/473 |
| 6,071,361 A | * | 6/2000 | Sato et al. ............ 148/516 |
| 2002/0192490 A1 | * | 12/2002 | Kanayama et al. ......... 428/626 |
| 2007/0253858 A1 | * | 11/2007 | Ababneh et al. ............ 420/487 |

FOREIGN PATENT DOCUMENTS

| | | |
|---|---|---|
| DE | 3304740 C2 | 8/1984 |
| DE | 199 63 385 C1 | 1/2001 |
| EP | 0 921 211 B1 | 6/1999 |
| JP | 08-283889 | * 10/1996 |
| KR | 2001009894 | * 2/2001 |

OTHER PUBLICATIONS

JP 08-283889 English Machine Translation, Nakajima et al, Oct. 1996.*

* cited by examiner

*Primary Examiner*—Jennifer C McNeil
*Assistant Examiner*—Jason L Savage
(74) *Attorney, Agent, or Firm*—Flynn, Thiel, Boutell & Tanis, P.C.

(57) ABSTRACT

The invention relates to a material composite in strip form, process for producing said composite and use of the material composite as a sliding element. The material composite comprising a layer consisting of a copper multicomponent alloy which is permanently joined to a steel supporting layer, where the copper multicomponent alloy is composed of [in % by weight]:
Ni 1.0 to 15.0%,
Sn 2.0 to 12.0%,
remainder Cu and inevitable impurities,
optionally up to 5% manganese,
optionally up to 3% silicon,
optionally individually or in combination up to 1.5% Ti, Co, Cr, Al, Fe, Zn, Sb,
optionally individually or in combination up to 0.5% B, Zr, P, S,
optionally up to 25% Pb.

11 Claims, 1 Drawing Sheet

COMPOSITE MATERIAL IN STRIP FORM AND ITS USE, COMPOSITE SLIDING ELEMENT

Figure 1:
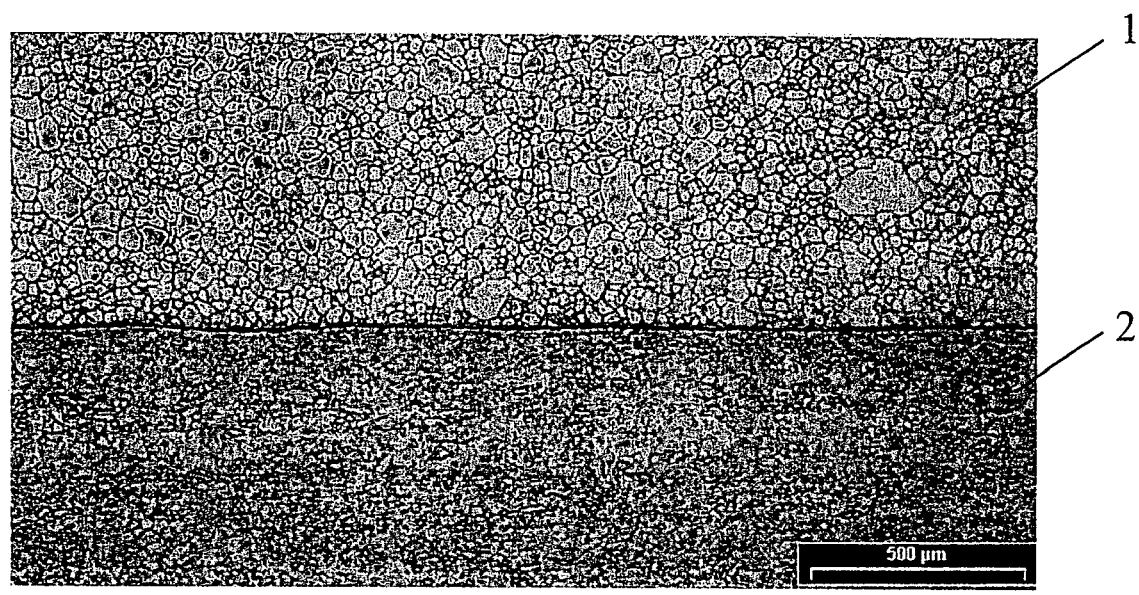

The invention relates to a composite material in strip form, its use and to a composite sliding element consisting of the composite material in strip form.

Copper alloys have been successfully used in bearing applications over the course of decades. They satisfy the imposed demands particularly well on account of their microstructure and properties. However, it has been found that limits are imposed on conventional bronzes and complex brass alloys under high thermal stresses.

As an alternative to conventional liners made from solid bearing materials, it is also known to use steel composite liners. To produce these, by way of example, strips of lead-containing tin bronzes are plated onto steels by rolling processes. However, bearing materials of this type comprising tin bronzes with tin contents of 4-8% by weight do not satisfy all the high demands imposed on the bearing materials in the high-stress environment of an engine compartment.

Document DE 199 63 385 C1 has disclosed a layered composite material for sliding bearings which has a higher specific load-bearing capacity and reduced wear rate. The layered composite material includes a carrier layer, a bearing metal layer, a first interlayer of nickel, a second interlayer of nickel and tin as well as a sliding layer consisting of copper and tin. The sliding layer includes a tin matrix in which tin-copper particles are intercalated, consisting of 39 to 55% by weight copper, the remainder being tin.

At high temperatures, as are encountered by sliding bearings in internal combustion engines, the tin migrates into the second interlayer located below, resulting in a concentration of the tin-copper particles.

Furthermore, document DE 33 04 740 C2 has disclosed multilayer sliding bearings which comprise a solid metallic supporting body, a softer metallic carrying layer, for example made from an aluminum bearing alloy, and a sliding layer of a tin-containing, lead-based bearing alloy applied by electrodeposition. An inlay double layer which includes a copper alloy layer is arranged between the carrying layer and the sliding layer.

Document EP 0 921 211 has also disclosed a layered composite material for sliding bearings having a carrier layer, a bearing metal layer of a copper alloy with a copper content of from 60 to 95% by weight or an aluminum alloy with an aluminum content of from 60 to 96% by weight, a diffusion barrier layer and a sliding layer of a lead-free copper-tin alloy applied by electrodeposition.

The invention is based on the object of developing a composite material in strip form and a composite sliding bearing in such a way that both a high wear resistance and a high hot strength are produced.

In terms of a composite material in strip form, the invention is represented by its features, the use of the composite material in strip form and a composite sliding element containing the composite material strip. There are also advantageous refinements and developments of the invention.

The invention encompasses a composite material in strip form, in which a layer consisting of a copper multicomponent alloy is permanently joined to a steel supporting layer, where the copper multicomponent alloy is composed of, in % by weight:

Ni 1.0 to 15.0%,

Sn 2.0 to 12.0%, with the remainder being Cu and inevitable impurities, and optionally up to 5% manganese, optionally up to 3% silicon, optionally individually or in combination up to 1.5% Ti, Co, Cr, Al, Fe, Zn, Sb, optionally individually or in combination up to 0.5% B, Zr, P, S, optionally up to 25% Pb.

The invention is based on the consideration that a high-performance composite material is provided, consisting of steel and a Cu—Ni—Sn alloy permanently joined to the steel. The purpose of the composite material is to simultaneously offer very good wear resistance and, on account of its use as a sliding element in an environment imposing high thermal stresses, an excellent hot strength.

The wrought Cu—Ni—Sn alloys according to the invention are spinodally segregated systems, which are already known in principle as a solid material used as bearing materials in engine manufacture. These materials have good frictional and wear properties and a good resistance to corrosion. The thermal stability is likewise excellent.

With these materials, having a Ni content of 1-15% and Sn content of 2-12%, it is possible to achieve degrees of cold-forming of up to 60%. In combination with soft-annealing, it is possible to produce thin strips suitable for composite materials. These strips can optionally be age-hardened in the temperature range between 300 and 500° C. As a result, the material is work-hardened on account of the spinodal segregation which takes place. Moreover, it is possible to form continuous or discontinuous precipitation.

This form of precipitation hardening is significantly superior to binary copper-based alloys. To optimize the bonding strength between the Cu—Ni—Sn alloy and the steel strip, the surfaces of both materials are pretreated. Thermal stability and strength combined, at the same time, with the required ductility is realized by the precipitation-hardened materials according to the invention for bearing elements which are exposed to high demands.

The advantages achieved by the invention, compared to solid liners, are in particular that with the composite material, the demands relating to the mechanical properties and the tribological properties can be optimized separately from one another by the combination of steel and a copper multicomponent alloy layer. The material properties of both partners in the composite can be optimally adapted to the particular requirements by means of rolling, age-hardening and homogenization annealing. By way of example, it is also possible for a softer or harder copper multicomponent alloy layer to be combined with the steel supporting layer by means of mechanical and thermal treatments. The combination of the two materials in one composite material produces material properties which are eminently suitable for sliding element applications.

In this context, an inexpensive structure results from the fact that the volumetric content and the weight content of the steel carrier material are greater than the content of the functional material comprising the copper multicomponent alloys.

In a particularly preferred embodiment of the invention, the copper multicomponent alloy may be composed of, in % by weight:

Ni 1.0 to 15.0%,

Sn 2.0 to 12.0%,

Mn 0.1 to 2.5%,

Si 0.1 to 1.5%, and the remainder being Cu and inevitable impurities, and optionally individually or in combination up to 1.5% Ti, Co, Cr, Al, Fe, Zn, Sb, optionally, individually or in combination up to 0.5% B, Zr, P, S.

This pursues the objective of further improving the wear resistance of Cu—Ni—Sn alloys by forming hard intermetallic phases. These further hard-material phases are manganese-nickel silicides. Cu—Ni—Sn alloys already have very good properties in terms of the sliding properties, resistance to corrosion and resistance to relaxation at room temperature. However, the hard phases which are formed reduce the susceptibility to adhesion in the mixed friction range and also further increase the hot strength and ductility at elevated temperatures.

Surprisingly, by combining the microstructural constituents which contribute to wear resistance with a spinodally segregated alloy of the Cu—Ni—Sn system, it is possible on the one hand to reduce the run-in requirements resulting from wear at the start of the application of stresses and, on the other hand, a Cu—Ni—Sn—Mn—Si material of this type also proves to have a good hot strength and sufficient ductility.

The supporting layer may advantageously consist of deep-drawn steel, quenched and tempered steel or case-hardened steel. Further high-strength steels may also be considered.

The layer consisting of the copper multicomponent alloy may advantageously have a thickness of from 0.1 to 3 mm. Strips of the copper multicomponent alloy can be rolled down to this thickness by means of a suitable thermomechanical treatment.

In terms of the process, the layer consisting of the copper multicomponent alloy can be rolled or cast or sintered onto the steel supporting layer. For this purpose, in the case of rolling, the surface of the strip material of the supporting layer and that of the copper multicomponent alloy can be pretreated and cleaned. In the simplest possible case, this is done by a mechanical pretreatment using brushes.

The roll-clad strips may advantageously be particularly suitable for the production of composite sliding elements, for example in the form of rolled liners and thrust washers. This alloy can also be used for plug connectors used in electrical engineering.

In a preferred configuration of the invention, a composite sliding element may consist of the composite material in strip form according to the invention, which before and/or after shaping has undergone at least one heat treatment at 300 to 500° C., causing the material to be work-hardened as a result of the spinodal segregation which takes place.

A composite sliding element made from the composite material in strip form according to the invention, before and/or after shaping, has advantageously undergone at least one heat treatment at 600 to 800° C. The heat treatment in this range leads to homogenization, whereby the material becomes softer.

Alternatively, a composite sliding element may undergo a combination of at least one solution annealing at 600 to 800° C. and at least one age-hardening treatment at 300 to 500° C. The material properties of the copper multicomponent alloy can be optimally matched to its partner in the composite, namely steel, by means of a homogenization annealing and the hardening of the material during age-hardening or rolling.

In a preferred configuration of the invention, an interlayer may be arranged between the surface of the steel supporting layer and the layer consisting of the copper multicomponent alloy.

This interlayer is intended in particular to prevent diffusion phenomena at the interface between the copper multicomponent alloy and the steel and, if appropriate, also to boost the bonding ability of both partners.

In a further preferred configuration, lubricating pockets may be arranged in the layer consisting of the copper multicomponent alloy.

Exemplary embodiments of the invention are explained in more detail on the basis of the following examples and the optical microscopy image, shown in FIG. 1 of a composite material comprising a CuNiSn alloy and a steel strip.

EXAMPLE 1

For the tests, the applied material was CuNi6Sn6 in the as-rolled and soft-annealed state, and the base material used was steel in various states. The specimens were treated with brushes and then cleaned.

This was immediately followed by rolling with different reductions per pass. The starting thickness of the strips of the copper multicomponent alloy was approx. 3 mm. The different strip thicknesses of the base material were 1.5, 3 and 5 mm. The width of the copper multicomponent alloy was approx. 0.1-0.3 mm less than that of the base material. Rolling forces, moments and outlet temperatures were measured. In each case five variations per combination were carried out for each material state having the above-mentioned thicknesses of the base material. The rolling tests showed that CuNi6Sn6 can be readily plated onto steel with good material bonding.

FIG. 1 shows an optical microscopy image of a cross section through a composite material made up of a CuNiSn alloy 1 and a steel strip 2. The composite bearing material can be used by roll-cladding in the as-rolled state, in the soft-annealed state and in the age-hardened state. The homogenization temperatures are between 500 and 800° C., an age-hardening takes place at temperatures between 300 and 500° C.

EXAMPLE 2

The following text describes a process for producing a composite material comprising the copper multicomponent alloy for sliding elements, such as thrust washers and bearing liners. In this process, a lead-free bearing material from the Cu—Ni—Sn system is applied to deep-drawn steel by melting and casting. The lead-free bearing material was cast on at a temperature of 1000 to 1200° C., with the layer microstructure being formed from α-phase with continuous and discontinuous precipitations. The composite material comprising steel and the Cu—Ni—Sn alloy was annealed at temperatures between 600 and 800° C., and then the surface of the layer was removed by milling. These layer bearing materials can be used both in the as-cast state and in the age-hardened state for sliding bearing elements. The age-hardening was carried out at temperatures between 300 and 500° C.

The cast microstructure of the bearing layer was wrought by thermomechanical treatments, such as rolling and annealing. The strips can be cold-rolled with degrees of deformation of between 10 and 60% and then annealed at temperatures between 500 and 800° C. It has been found that the composite bearing material can be used in all its various states, i.e. in the as-cast state, in the wrought state and in the age-hardened state, for sliding elements.

EXAMPLE 3

In a further series of tests, ingots with different Mn—Si ratios were cast and then cold-worked further. The alloy variants tested are summarized in Table 1. The cast ingots were homogenized in the temperature range between 700 and 800° C. and then milled. Strips with thicknesses of between 2.5 and 2.85 mm were then produced by a plurality of cold-forming stages and intermediate annealing steps. The strips were cold-rolled and then annealed in the temperature range between 700 and 800° C. in order to achieve sufficient cold-formability.

TABLE 1

| Cu – Ni – Sn + Mn + Si | Cu [% by weight) | Ni [% by weight] | Sn [% by weight] | Mn [% by weight] | Si [% by weight] |
|---|---|---|---|---|---|
| Variant 1 | Remainder | 5.6-6.0 | 5.2-5.6 | 1.7-2.0 | 0.2-0.3 |
| Variant 2 | Remainder | 5.6-6.0 | 5.2-5.6 | 1.3-1.6 | 0.2-0.3 |
| Variant 3 | Remainder | 5.6-6.0 | 5.2-5.6 | 1.3-1.6 | 0.5-0.7 |
| Variant 4 | Remainder | 5.6-6.0 | 5.2-5.6 | 0.8-1.0 | 0.1-0.3 |
| Variant 5 | Remainder | 5.6-6.0 | 5.2-5.6 | 0.8-1.0 | 0.3-0.5 |
| Variant 6 | Remainder | 5.6-6.0 | 5.2-5.6 | 0.4-0.6 | 0.4-0.6 |
| Variant 7 | Remainder | 5.6-6.0 | 5.2-5.6 | 0.9-1.1 | 0.9-1.1 |
| Variant 8 | Remainder | 5.6-6.0 | 5.2-5.6 | 1.8-2.1 | 0.5-0.6 |
| Variant 9 | Remainder | 5.6-6.0 | 5.2-5.6 | 1.8-2.1 | 0.9-1.1 |

As expected, it was confirmed that the cold-formability of the Cu—Ni—Sn alloy modified with silicides is slightly lower than that of a Cu—Ni—Sn alloy without further silicide phases.

In a further process step, strips of this type are combined to form a strong composite material by roll-cladding processes. The tribological tests demonstrated that the silicide-modified Cu—Ni—Sn alloys had a significantly lower coefficient of friction than the unmodified variant. This new modified alloy is therefore particularly suitable as a primary material for use as a sliding element (liners, thrust washers, etc.) in the automotive industry for engines, transmissions and hydraulics.

However, over and beyond the values indicated in the table, it has been found that modified Cu—Ni—Sn variants with an Si content of up to 1.5% by weight and a Mn content of up to 2.5% by weight can be manufactured with improved material properties. Further laboratory tests to demonstrate this have likewise already been carried out, confirming the limit values.

In particular, it has been ensured that with an Si content of up to 0.7% by weight and an Mn content of up to 1.6% by weight, manufacturing is actually possible without problems from a manufacturing technology perspective. If higher silicon and manganese contents are used, corresponding adjustments in line with standard measures should be performed with regard to the casting parameters.

However, difficulties, in particular caused by cracks at the edges of the strip material, are likely during further processing if the silicon and/or manganese contents exceed the indicated maxima of 3% by weight and 5% by weight, respectively.

The CuNiSn alloy contains finely distributed manganese-nickel silicides which are embedded in the alloy matrix. These silicides, as the first precipitation in the melt, are formed as early as the temperature range around 1100° C. If the melt composition is selected appropriately, the available silicon and manganese are precipitated with a nickel content which is present in excess to form the silicide. The nickel content consumed in the silicide can be correspondingly taken into account for the subsequent formation of the matrix by using a higher nickel content in the melt.

The composition of the silicides does not necessarily have to correspond to a predetermined stoichiometry. Depending on the procedure adopted, determined in particular by the cooling rate, ternary intermetallic phases precipitate in the form of the silicides of type $(Mn,Ni)_xSi$, which are in the range between the binary boundary phases $Mn_5Si_3$ and $Ni_2Si$.

The invention claimed is:

1. A composite material strip comprising a layer consisting of a copper multicomponent alloy permanently joined to a steel supporting layer, the copper multicomponent alloy comprising, in % by weight, 1.0 to 15.0% Ni, 2.0 to 12.0% Sn, 0.1 to 2.5% Mn, 0.1 to 1.5% Si and, optionally, at least one of Ti, Co, Cr, Al, Fe, Zn and Sb in an amount up to 1.5%, at least one of B, Zr, P and S in an amount up to 0.5% and Pb in an amount up to 25%, with the balance being Cu and inevitable impurities, wherein manganese-nickel silicides, which are in the range between the binary boundary phases $Mn_5Si_3$ and $Ni_2Si$, as hard intermetallic phases are formed in the copper multicomponent alloy and the composite material strip has undergone a combination of at least one solution anneal at 600 to 800° C. and at least one age-hardening treatment at 300 to 500° C. to match the material properties of the copper multicomponent alloy to the steel supporting layer.

2. A sliding element or plug connector comprising the composite material strip of claim 1.

3. A composite sliding element consisting of the composite material strip of claim 1, characterized in that before and/or after a shaping treatment, the composite material strip has undergone at least one heat treatment at 300 to 500° C.

4. A composite sliding element according to claim 3, characterized in that an interlayer is arranged between a surface of the steel supporting layer and the layer consisting of a copper multicomponent alloy.

5. A composite sliding element according to claim 3, characterized in that lubricating pockets are arranged in the layer consisting of the copper multicomponent alloy.

6. A composite sliding element consisting of the composite material strip of claim 1, characterized in that before and/or after a shaping treatment, the composite material strip has undergone at least one heat treatment at 600 to 800° C.

7. The composite material strip according to claim 1, comprising 5.6 to 6.0% Ni and 5.2 to 5.6% Sn.

8. The composite material strip according to claim 1, consisting of 1.0 to 15.0% Ni, 2.0 to 12.0% Sn, 0.1 to 2.5% Mn, 0.1 to 1.5% Si and, optionally, at least one of Ti, Co, Cr, Al, Fe, Zn and Sb in an amount up to 1.5%, at least one of B, Zr, P and S in an amount of up to 0.5% and Pb in an amount up to 25% with the balance being Cu and inevitable impurities.

9. The composite material strip according to claim 8, wherein Ni is present in an amount of from 5.6 to 6.0% and Sn is present in an amount of from 5.2 to 5.6%.

10. The composite material strip according to claim 1, characterized in that the supporting layer consists of deep-drawn steel, quenched and tempered steel or case-hardened steel.

11. The composite material strip according to claim 1, characterized in that the layer consisting of the copper multicomponent alloy has a thickness of from 0.1 to 3 mm.

* * * * *

UNITED STATES PATENT AND TRADEMARK OFFICE
CERTIFICATE OF CORRECTION

PATENT NO. : 7,790,295 B2  
APPLICATION NO. : 11/724380  
DATED : September 7, 2010  
INVENTOR(S) : Maher Ababneh et al.

It is certified that error appears in the above-identified patent and that said Letters Patent is hereby corrected as shown below:

Column 6, line 16; change "Co, Cr, AI, Fe, Zn" to --Co, Cr, Al, Fe, Zn--

Signed and Sealed this

Sixteenth Day of November, 2010

David J. Kappos  
*Director of the United States Patent and Trademark Office*